April 7, 1942.  L. H. KNIBB  2,278,617
REFRIGERATOR ICE CREAM FREEZER
Filed July 30, 1940  3 Sheets-Sheet 1

INVENTOR.
Leroy H. Knibb
BY
ATTORNEY.

April 7, 1942.  L. H. KNIBB  2,278,617
REFRIGERATOR ICE CREAM FREEZER
Filed July 30, 1940  3 Sheets-Sheet 2
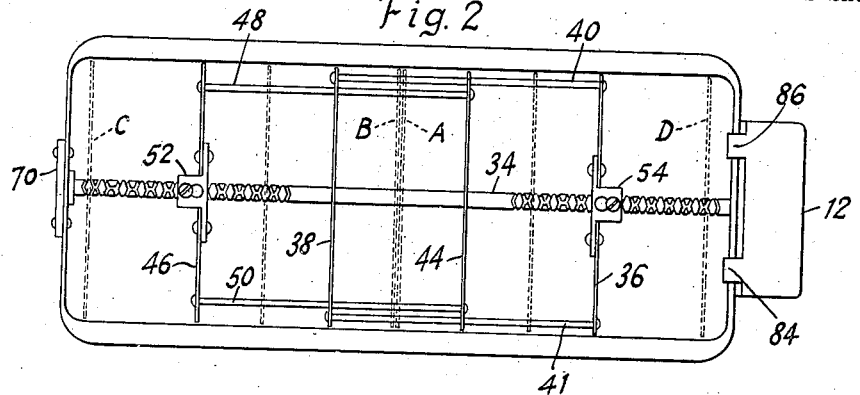
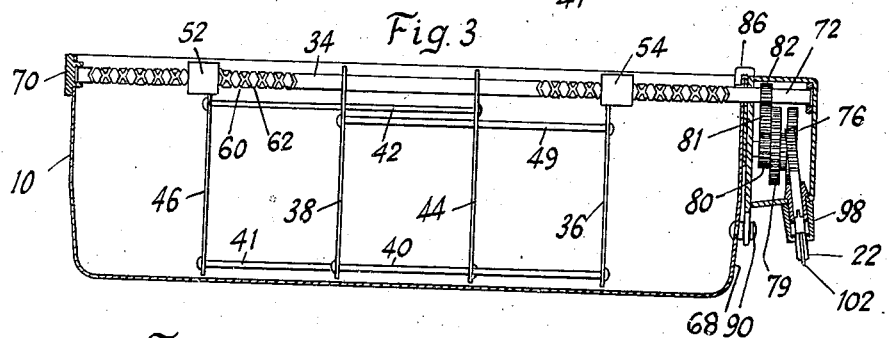
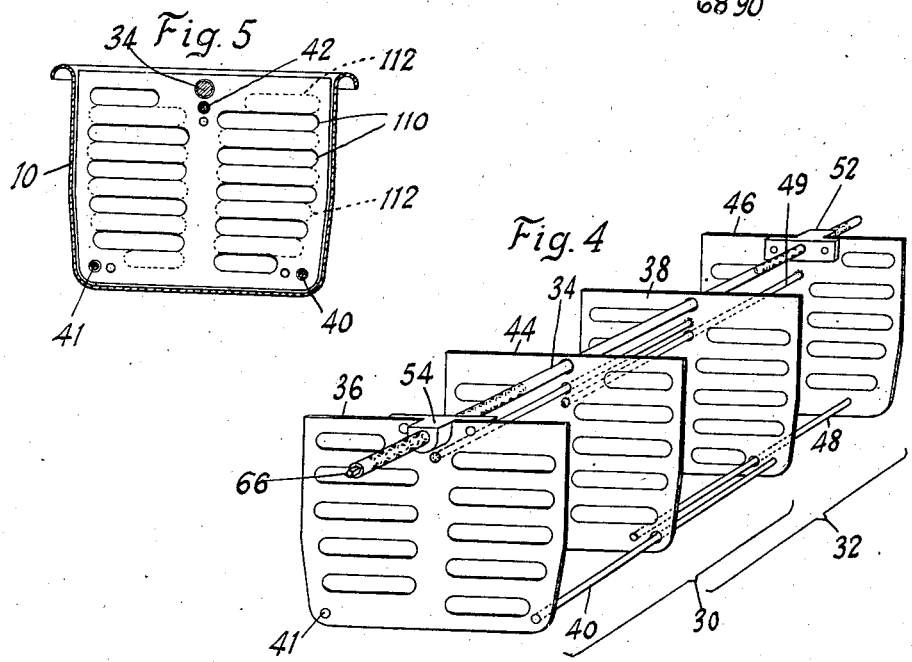
INVENTOR.
BY Leroy H. Knibb
ATTORNEY.

April 7, 1942.                L. H. KNIBB                2,278,617
                    REFRIGERATOR ICE CREAM FREEZER
                         Filed July 30, 1940            3 Sheets-Sheet 3
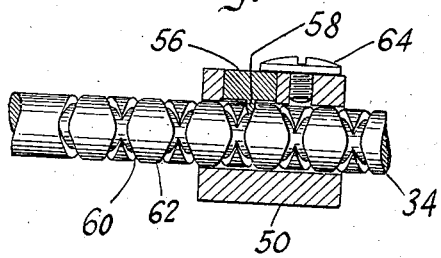
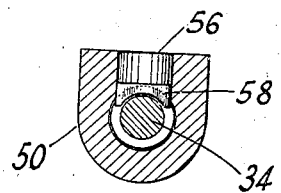
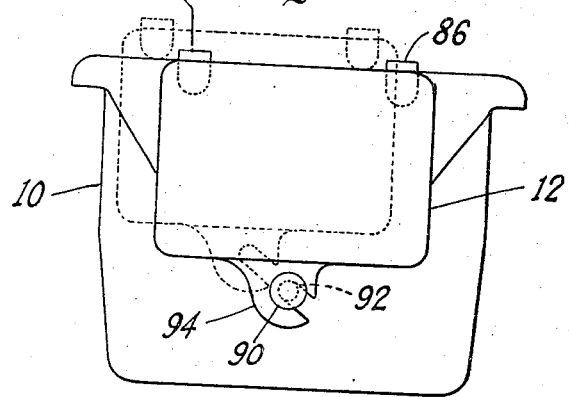
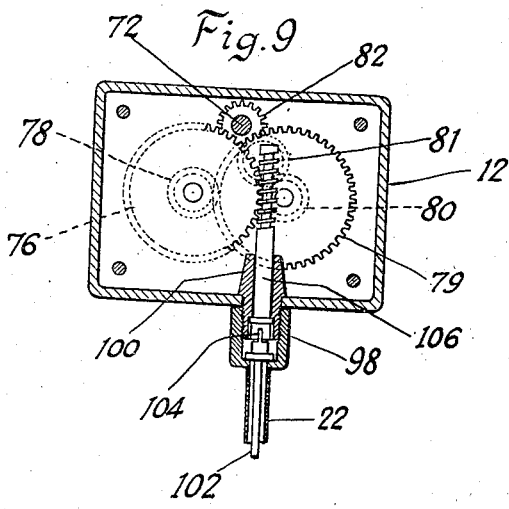
INVENTOR.
BY Leroy H. Knibb
ATTORNEY.

Patented Apr. 7, 1942

2,278,617

UNITED STATES PATENT OFFICE 2,278,617

REFRIGERATOR ICE CREAM FREEZER

Leroy H. Knibb, Sabot, Va.

Application July 30, 1940, Serial No. 348,353

4 Claims. (Cl. 62—114)

My invention relates to refrigerator ice cream freezers, and it particularly involves a freezing mixture tray having a detachable dasher mechanism and adapted to fit within the freezing compartment of a refrigerator, the dasher mechanism being operated by a motor remote from the tray and preferably located within the refrigerator food compartment.

The invention will be described with reference to the accompanying drawings, in which:

Fig. 2 is a plan of the illustrative tray and its associated dasher mechanism.

Fig. 3 is a longitudinal vertical section through the combined tray and dasher mechanism.

Fig. 4 is a perspective view of the dasher mechanism.

Fig. 5 is a transverse vertical section through the tray and dasher mechanism.

Fig. 6 and Fig. 7 are sectional views showing the details of the operative connection between the dasher mechanism units and their drive shaft.

Fig. 8 is an end elevation of the tray, illustrating the manner in which the reduction gear transmission is attached to the tray.

Fig. 9 is a vertical section of the reduction gear transmission.

Figure 1:
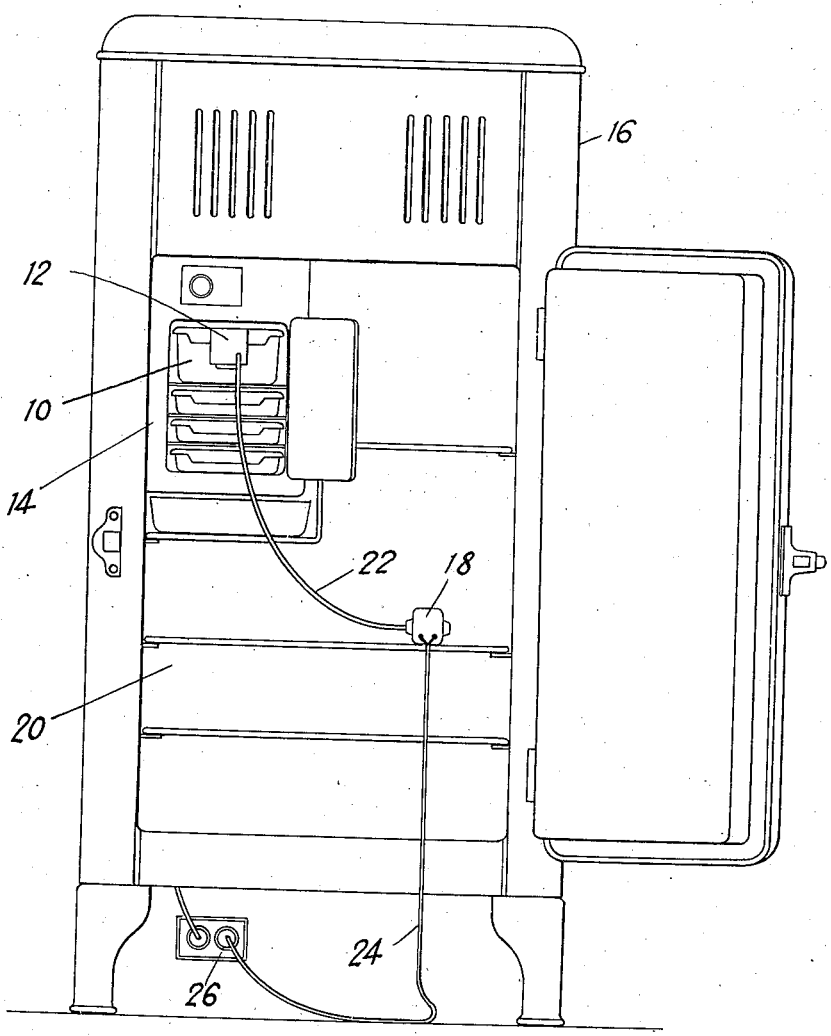
Fig. 1 is an elevation of the illustrative apparatus in association with a refrigerator.

In using the illustrative freezer, the tray 10 containing the ice cream mixture and having the Fig. 4 dasher mechanism and the reduction gear transmission 12 attached thereto is disposed within the freezing compartment 14 of the refrigerator 16. The motor 18 is disposed on a shelf within the food compartment 20 and its shaft is operatively connected with the reducing gear transmission by a flexible shaft 22. The line connection 24 is then plugged into the outlet 26, and the refrigerator closed.

The freezing mixture is then cooled by the freezing unit of the refrigerator and simultaneously moderately agitated by the dasher mechanism until the freezing mixture reaches the desired consistency. Then the dasher is removed and the mixture further cooled.

The dasher mechanism shown in detail in Figs. 2-5 consists of two similar and oppositely reciprocable units 30 and 32 which are slidable along the drive shaft 34, see Fig. 4.

The unit 30 includes the upright dasher plates 36 and 38 rigidly joined by the rods 40—41, and the complementary unit 32 involves similar dasher plates 44 and 46 rigidly connected by the rods 48—50. The units may be said to be cross-connected, the rods 40—41 passing through openings in the plate 44 so that there may be relative slidable movement at such positions. Similarly, the rods 48—50 pass through openings in the plate 38 of the unit 30 so that these rods may have slidable motion relative to the plate. These relationships of the components of units 30 and 32 are clearly shown in Fig. 4 when it is considered in connection with Figs. 2, 3, and 5.

The plates 36 and 46 have the journal boxes 52 and 54 fixed thereto, one double threaded or grooved end of the shaft 34 being rotatable in the box 52 and the similarly formed opposite end of the shaft being rotatable in the box 54.

Each box is constructed as indicated in Figs. 6 and 7. Here the box 52 is shown as provided with a cylindrical disk 56 turnable within an opening within the box. This disk is formed with a detent 58 which rides freely within the operating helical grooves 60 and 62 formed in the drive shaft 34. The disk 56 is held in its operative position by the set screw 64 screw threaded into the journal box. This arrangement causes the dasher units to oppositely reciprocate as the shaft 34 is rotated.

The dasher plates 38 and 44 are formed with openings slidably receiving the shaft 34 so that the dasher units are maintained in their operative relationships during their reciprocating action. The dasher plates are of such a conformation that their edges are close to the sides of the tray 10, as indicated in Fig. 5 of the drawings. This causes portions of the freezing mixture frozen to the sides of the tray to be scraped therefrom during the operation of the dasher mechanism.

The dasher mechanism and the tray 10 with its shaft openings are so associated that the dasher may be readily disposed in operative position by first extending the squared end 66 of the shaft 34 through an opening provided in the front wall 68 of the tray 10. The opposite end of the shaft is then positioned within the bearing socket provided in the bearing block 70 secured to the rear wall of the tray as shown in Fig. 3.

The squared end of the shaft 34 acts as a part of a power transmission coupling with the driven shaft 72 of the reducing gear transmission, the shaft 72, or an associated element, having a complementary coupling formation.

The shaft 72 is driven from the flexible shaft 22 by means of a worm 74, a worm gear 76, and the spur gear elements 78—82 inclusive operatively associated as indicated in Figs. 3 and 9 and housed within a gear casing. The latter is provided with the hook-like elements 84 and 86 for engaging the top of the tray as indicated in Figs. 3 and 8. After these elements are positioned over the top of the tray and the transmission is in its dotted line position, Fig. 8, the transmission is moved to its full line position to cause the locking pin 90 to be so disposed in the slot and so engaged with the stud 94 that the transmission becomes substantially locked in its operative position with its driven shaft 72 aligned with the drive shaft 34.

Thereafter, the screw-threaded coupling cap 98 is turned up on the externally threaded bearing member 100 to cause the rotating element 102 of the flexible shaft construction 22 to be operatively engaged with a complementary coupling member 104 on the end of the worm shaft 100.

With the opposite end of the flexible shaft coupled to the shaft of the motor 18 and the latter connected with a source of electricity the dasher mechanism begins to operate. The dasher plates 36, 38, 44 and 46 are provided with elongated openings such as those shown at 110 and 112 in Fig. 5, the openings 112 (dotted lines, Fig. 5) being formed in a plate adjoining that in which the openings 110 are formed, and the sets of openings being offset as indicated by the relationship of the full line openings 110 to the dotted line openings. This arrangement promotes a thorough and substantially uniform agitation of the freezing mixture as the units 30 and 32 slowly but oppositely reciprocate. Considering these units to be starting from their Fig. 4 positions, the plates 38 and 44 will be moved toward each other to force the intervening freezing mixture through the openings in those plates, and this movement preferably continues until these plates reach the positions indicated at A and B in Fig. 2, and almost contact each other. While this action is taking place the plates 46 and 36 are moving toward the opposite end walls (or toward positions C and D, Fig. 2) of the tray 10 to similarly force the freezing mixture through the openings in those plates. Similar action occurs when the units 30 and 32 move reversely.

When the consistency of the freezing mixture becomes such that there is too much resistance to the turning of the shaft 34 the motor 18 simply stops, the motor being designed to have such a low heating factor that it is not damaged by long continued flow of the electric current therethrough even when its rotor is stalled.

The components of the illustrative apparatus may be so coordinated that there has been the right amount of agitation when the motor stalls, and this action therefore will afford means for determining when the dasher should be removed from the tray and the ice cream mixture be allowed to further cool without agitation.

Although the invention has been described with reference to the details of the embodiment shown in the drawings it is to be appreciated that it is not lmited to all of the details thereof. It is rather to be taken as of a scope commensurate with the scope of the sub-joined claims.

I claim:

1. An ice cream freezer agitator unit comprising rigidly connected pairs of rigid plates with the connected plates of the different pairs forming relatively movable sub-units, one plate of each sub-unit being disposed between the plates of another sub-unit, and an operating shaft extending through all of the plates to rigidify the unit, the shaft also having operative connections with the plates to cause the sub-units to oppositely reciprocate within a container for a freezing mixture.

2. In an ice cream freezer for domestic refrigerators an ice compartment tray, two oppositely movable agitating units each having a plurality of upright partition plates extending entirely across the tray and permanently rigidly connected at positions toward each side of the tray, and an operating shaft extending through said plates and operatively connected therewith so as to cause the units to oppositely reciprocate longitudinally of the tray.

3. In an ice cream freezer for domestic refrigerators, a tray to fit within a refrigerator ice space, a drive shaft journalled across the tray, perforated plates normally disposed in upright position within the tray and held therein by reason of slidable mounting upon the shaft, alternate plates being rigidly connected by rods to provide first and second rigid units, the rods of each of said units being slidable through openings in a plate of the other unit, the frames being so operatively connected with the shaft that rotation thereof causes the units to oppositely reciprocate within the tray, and a motor operatively connected to the shaft.

4. In a nice cream freezer, a tray or drawer adapted to be placed within the ice tray compartment of a refrigerator, a rotatable shaft extending across the tray and journalled thereon at a fixed distance from the bottom of the tray, upright perforated plates normally disposed within the tray and provided with openings through which the shaft passes, means parallel to the shaft and including rods disposed toward opposite sides of the tray for fixedly connecting two of said plates to form a first rigid frame, rods similarly joining the remaining plates to form a rigid second frame, the rods of each of said frames being slidable through openings in one of the plates of the other frame, the frames being so operatively connected with the shaft that rotation thereof causes the frames to oppositely reciprocate, reduction gearing detachably secured to the tray, and a motor driving the shaft.

LEROY H. KNIBB.